Aug. 2, 1932.   G. BROWNING   1,870,035
AUTOMATICALLY TIMED ELECTRIC TOASTER
Filed Sept. 24, 1928   6 Sheets-Sheet 1

Inventor
George Browning
by Burton & Burton
his Attorneys.

Aug. 2, 1932.  G. BROWNING  1,870,035
AUTOMATICALLY TIMED ELECTRIC TOASTER
Filed Sept. 24, 1928  6 Sheets-Sheet 5

Fig. 8.

Witness
N. F. McKnight.

Inventor.
George Browning
by Burton & Burton
his Attorneys.

Patented Aug. 2, 1932

1,870,035

UNITED STATES PATENT OFFICE

GEORGE BROWNING, OF WILMETTE, ILLINOIS, ASSIGNOR TO CHICAGO FLEXIBLE SHAFT COMPANY, OF CHICAGO, ILLINOIS, A CORPORATION OF ILLINOIS

AUTOMATICALLY TIMED ELECTRIC TOASTER

Application filed September 24, 1928. Serial No. 307,896.

The purpose of this invention is to provide an improved construction of an automatic electric heat-treating apparatus, such for example as a toaster, having the heat-treating period controlled by a timing device. It consists in the elements and features of construction shown and described as indicated in the claims.

The organization and cycle of operation of the apparatus as a whole will be first described in general terms without designating the parts in detail.

The apparatus comprises a frame structure which supports a fixed carrier for the article or substance to be heat treated, and a heating unit for which said frame structure affords a track on which said heat unit travels to and from position suitably proximate to the fixed carrier of the substance to be treated for effecting the heat treatment for which the apparatus is constructed. This frame structure includes a casing for enclosing and protecting a gravity-operated timing device hereinafter referred to as the "timer" and the train of gears, which the timer in a manner controls, connecting a heating unit with a spring, whose reaction for operating the train to move the heating unit to and from heat-treating position when the timer by automatic gravity action at the limit of its period, moves and releases a catch, which until thus released locks the train, holding the heating unit in heat-treating position.

The heating unit is propelled to heat-treating position by the train when the initial gear of that train is actuated by a hand lever to wind the spring by means of one gear of the train, while another gear of the train engaging a rack on the heating unit propels the latter to heat-treating position, at which it is automatically locked by the catch mentioned.

Referring to the drawings:—The frame structure comprises a base, 10, upon which is mounted the casing mentioned consisting of two sheet metal stampings, 11—11, which enclose a gear train frame indicated in its entirety by reference letter, A, and comprising side plates, 13 and 14, and corner cross tie rods, 15, 15, 15, 15, which casing serves to support the remainder of the frame structure consisting of opposite parallel side bars, 16, 16, formed integrally with the sheet metal stampings, 11 and 12, respectively, and which are turned up at both ends as seen at 16ª, the corresponding ends of the opposite bars being connected by cross rods, 17, which support and are connected by slender rods, 18, securely engaged at their ends with the rods, 17, 17, in any suitable manner and spaced apart on said rods, 17, by spacing sleeves, 19, and constituting a fixed carrier indicated in its entirety by reference letter D for the substance to be heat-treated,—in the structure shown, bread slices to be toasted.

The heating unit hereinafter more particularly described comprises an upper heater, 20, and a lower heater, 21, suitably connected for movement as a unit, and having at the under side of the lower member a rack bar, 22, which is meshed with a gear pinion, 69, of the gear train hereinafter more particularly described, of which the elements including said pinion, 69, are mounted in the gear train frame, A, for propelling the heating unit back and forth on the supporting frame structure; and for that movement there are provided rollers, 23, one at each corner of the lower heater for which rollers the upper edges of the longitudinal side bars, 16, afford tracks as seen at 16ª.

The timer and gear train mounted on the frame, A, will next be described in detail. The timer, B, is a device of the hourglass type, comprising two conical chambers, 40 and 41, whose cavities communicate through a restricted passage, 42, regulated as to full capacity of the gravitating material with which the chambers are supplied,—indicated in dotted lines at 43,—by a valve device, 44, which is mounted axially in the rock shaft, 45, by which the timer is carried, said valve device being adjustable by means of its stem extended out through the rock shaft to the exterior of the frame and casing, and provided with a knob handle, 46, and an index finger, 47, co-operating with a graduated scale, 47ª, carried by the protruding end of the rock shaft, for advising the operator as to the adjustment of the valve, which it will be understood determines the time-period of the timer.

The timer rock shaft obtains a journal bearing as indicated at its protrusion through the side bar, 14, of the frame, A, and is journaled at the opposite end in the end of a co-axially mounted stud axle, 49, which protrudes inwardly from the opposite side plate, 13; and on this stud there is journaled a gear, 48, which is further connected to the stud by a spring, 50, coiled around the stud and secured at one end thereto as seen at 51, the other end being extended transaxially from the coil along the face of the gear, 48, for encounter with a stud, 53, mounted in said gear, said encounter being in the direction of the spring's reaction from coiling for tensioning it, which will be effected by rotating the gear to any predetermined amount on the stud.

Figure 2:
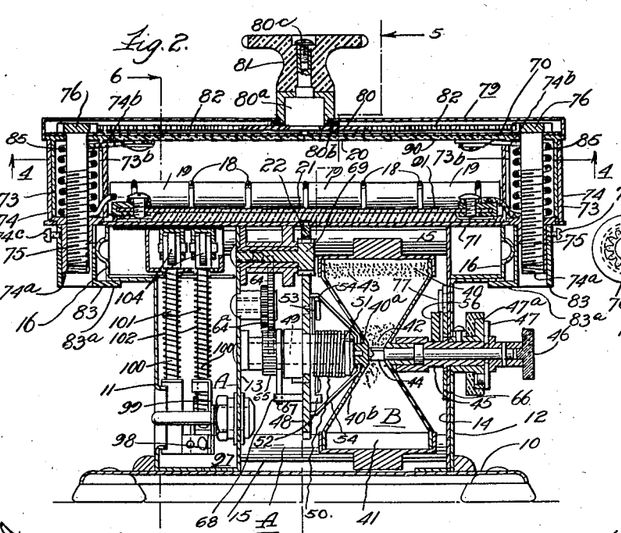
Figure 2 is a section at the line 2—2 on Figure 1.
Figure 3:
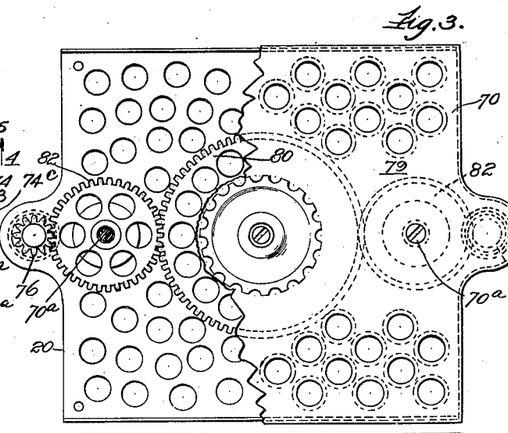
Figure 3 is a top plan view of the upper heating element partially broken away to show the underlying construction.
Figures 4, 17:
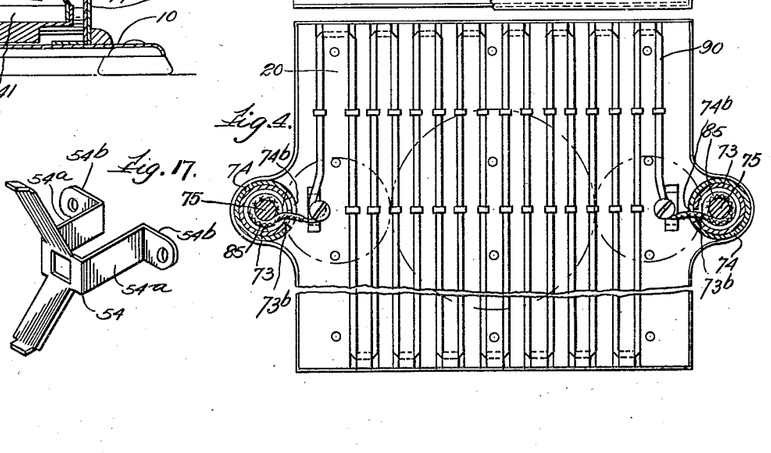
Figure 4 is a partly sectional underside plan view of the upper heating element showing the heating filaments, section being taken at the line 4—4 on Figure 2.
Figures 16 and 17 are views respectively of a blank and formed bar concerned in the operation of the timer.
Figures 5, 9, 10:
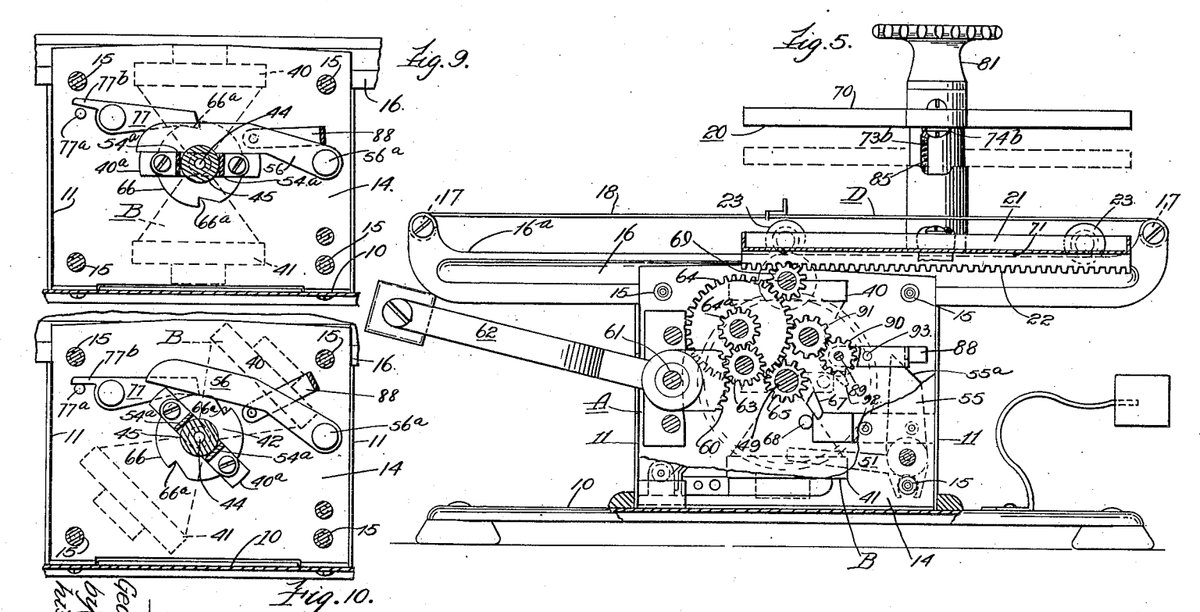
Figure 5 is a longitudinal vertical section taken at the line 5—5 on Figure 2.
Figures 9 and 10 are sections at the line 9—10 on Figure 2 showing the timer and associate control members in different positions.
Figure 6:
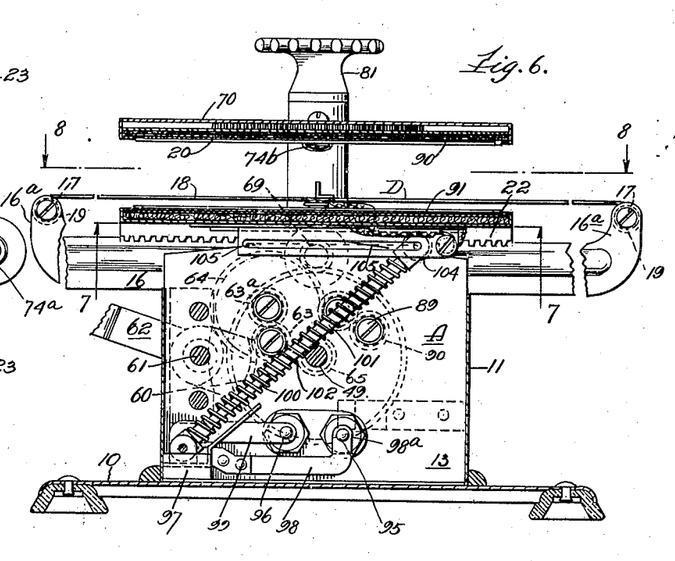
Figure 6 is a longitudinal vertical section taken at the line 6—6 on Figure 2.
Figure 7:
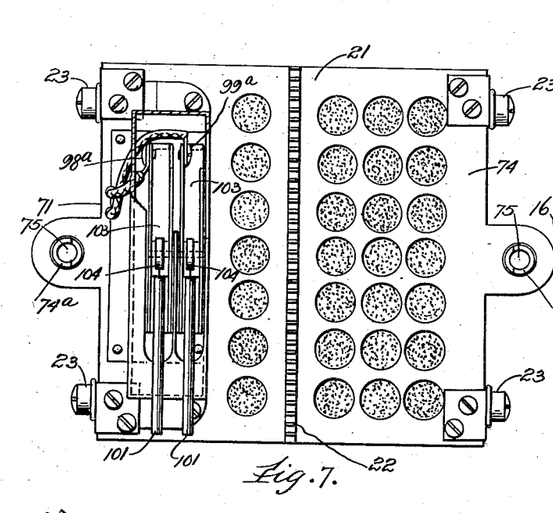
Figure 7 is a bottom plan view of the heating unit showing also an underside elevation portion of the electric circuit connections.
Figure 8:
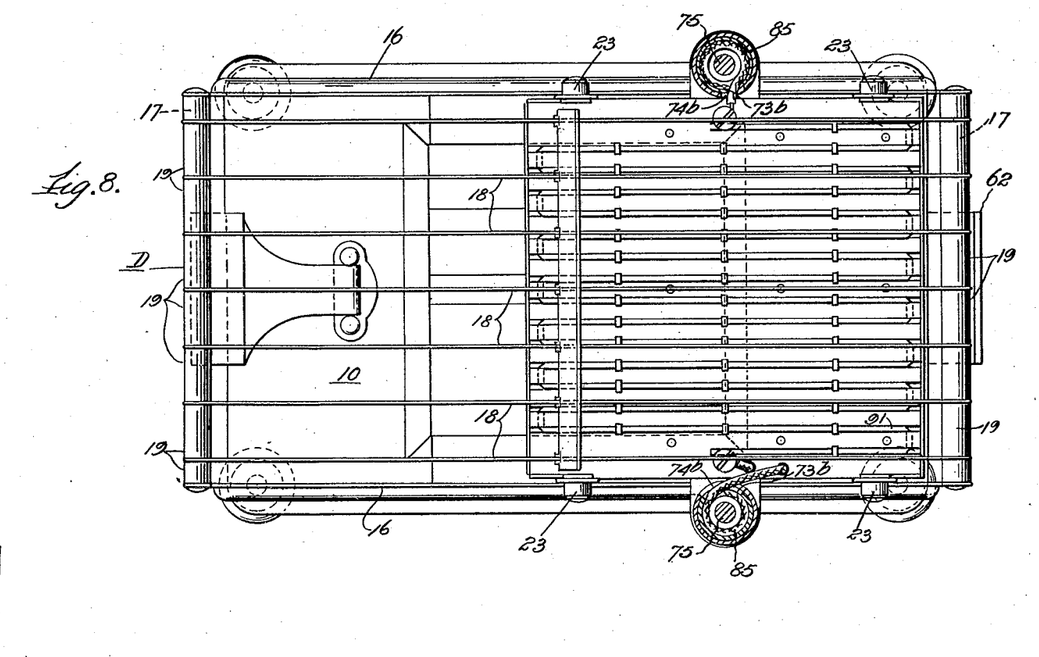
Figure 8 is a top plan view of the apparatus with the heating unit removed.
Figure 11:
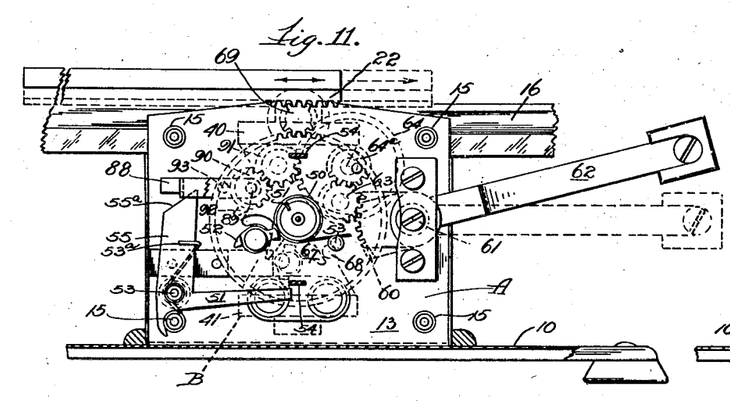
Figure 11 is a fragmentary view showing in side elevation the operating gear train in relation to the timer shown in dotted line at the position corresponding to the position of the train therein shown.
Figure 16:
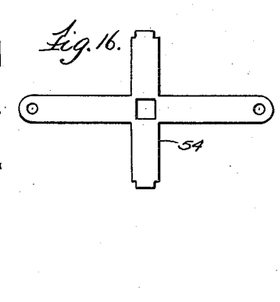
Figure 18:
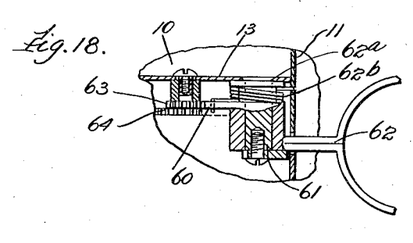
Figure 18 is a fragmentary section showing the operating lever and its connection.

On the face toward the timer of the gear, 48, said gear carries a spring-actuated pawl, 52; and carried rigidly with the timer in its rotative movement, there is provided a diametrically extending bar, 54, having its ends flexed for extending divergently along the slopes of the opposite conical members of the timer, and terminating in position to encounter the pawl, 52, and pass it in rotating in one direction and engage it in rotating in the other direction, for a purpose which will hereinafter appear. The detail construction of the bar, 54, for its rigid connection with the timer and for other purposes which will hereinafter appear, is as seen in Figures 2, 16 and 17, said bar being part of a die-cut blank, seen in Figure 16, in its blank form before folding into operative form,—viz, flexed to form parallel limbs, 54ª, 54ª, bent oppositely to form feet, 54ᵇ, 54ᵇ, by which the device is secured rigidly to a cross head, 40ª, of the hub, 40ᵇ, of the timer, which cross head is provided for a further purpose hereinafter described.

The gear, 48, is rotated for winding up the spring, 50, by a gear train consisting of a gear segment, 60, carried on a rock shaft, 61, which is provided with a lever operating handle, 62, for manual actuation of the operator, said gear segment being meshed with a pinion, 63, which meshes with a gear, 64ª, rigid with the gear, 64, journaled on a stud axle projecting from the frame side bar, 13, said gear, 64, being meshed with the pinion, 65, journaled on a stud axle, 49, and having a lever arm, 67, which is extended radially for encounter with a pin, 68, which projects rigidly from the proximate face of the gear, 48.

Figure 1:
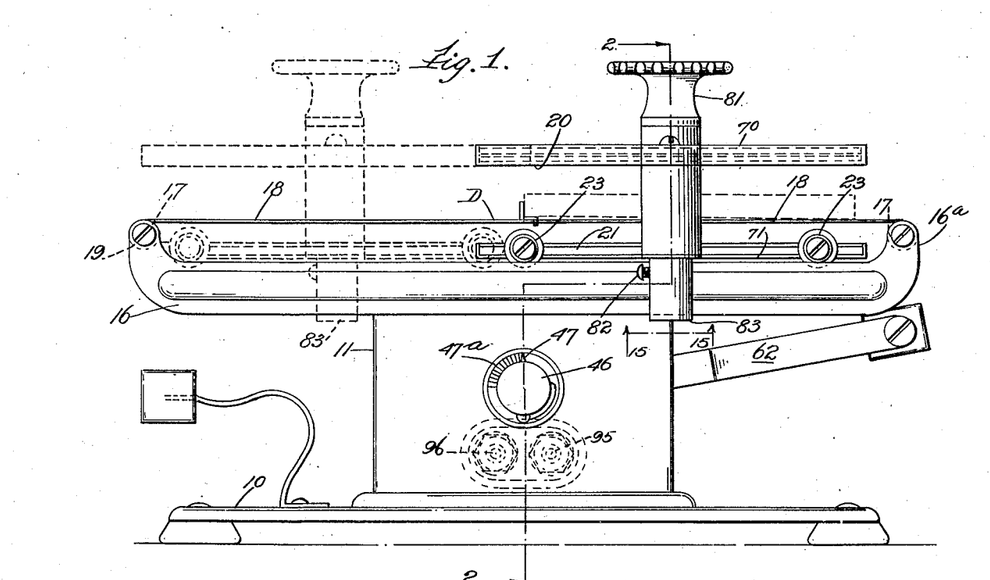
Figure 1 is a side elevation of an apparatus embodying the invention.

The operating lever handle, 62, is fulcrumed on the side plate, 13, as seen at 62ª and is provided with a spring, 62ᵇ, coiled about its pivot in the direction to be tensioned by the operation of the handle lever for actuating the train as hereinafter described and for reacting to retract the lever handle and reverse the train. A pinion, 69, hereinafter further mentioned meshes with the gear, 48, at the upper side of the latter and meshes also with the rack, 22, as above mentioned for propelling the heating unit. and the full stroke of the handle, 62, causes the gear, 48, to be rotated through 180°, and through the pinion, 69, propels the heating unit from idle position seen in dotted line in Figure 1 to heat-treating position shown in full line in that figure; and at the limit of the 180° rotation of the gear, 48, it is automatically latched against reverse movement by a spring-stressed catch lever consisting of the horizontal arm of a bell crank lever, 51, carried by a rock shaft, 53, and having a spring 53ª, coiled about the shaft reacting on its upright arm, 55, for holding that arm stopped against the lower corner tie rod, 15, of the frame, and holding the end of the horizontal arm upwardly in position for encounter in the final part of the 180° movement of the gear, 48, by a stud, 57, which projects from the face of the gear, the catch lever being forced down by the encounter and snapping up behind the stud, which runs off the end of the lever. The upright arm, 55, of the catch lever has its upper end beveled as seen at 55ª for a purpose hereinafter explained.

Figure 12:
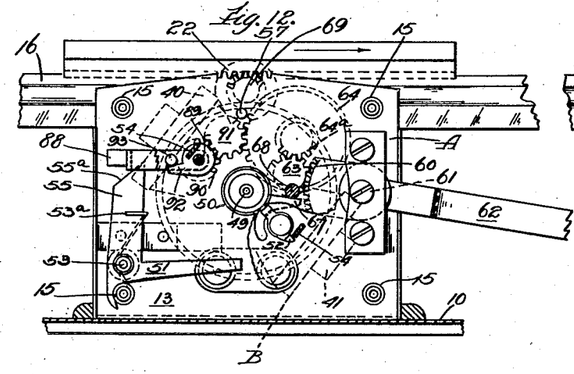
Figures 12, 13 and 14 are views similar to Figure 11 showing the parts in different position, the timer being shown in section in full line in Figure 14.
Figure 13:
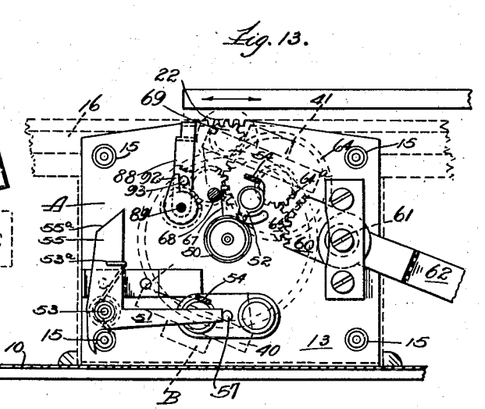

In the 180 degree movement of the gear, 48, as already described, the pawl, 52, engaging one end of the bar, 54, has rocked the timer from its erect position through something less than 180° to the position seen in Figure 14 carrying its loaded end to the upper side of the pivot, but not past the vertical plane of the pivot; and to insure that it shall not be carried by momentum past that position, and for an additional purpose hereinafter explained, there is provided a member which in view of said additional purpose is hereinafter referred to as the "tripper", consisting of a U-shaped lever, 88, fulcrumed at the ends of the U-limbs respectively on the front plate, 14, and on the stud axle, 89, carried by the rear plate, 13, of the gear pinion, 90, which is meshed with and driven by an idling gear, 91, meshing in turn with the gear, 64. The pinion, 90, has a rigid lever arm, 92, which projects suitably for encounter with a stud, 93, on the adjacent limb of the tripper, 88. In the operation of the train as described for winding up the spring, in which also, as described, the gear, 48, is rotated 180°, and the timer is rocked to the position last described seen in Figure 12, the lever arm, 92, engages the stud, 93, and rocks the tripper from the position at which it is shown in Figure 12 upwardly to meet the timer which is being simultaneously rocked in the opposite direction; and the parts are dimensioned to cause the tripper to encounter the upwardly rocked end of the timer at the instant of the arrest of the actuating movement and the latching of the gear, 48, by the latch as described, and thus before the timer has passed the vertical plane of its pivot.

The fulcrum of the tripper at the points indicated is so located that at the encounter of the tripper with the timer as above described the tripper bar has passed slightly beyond the vertical plane of its pivot and thus tends to lean lightly against the encountered upper end of the timer.

Figure 14:
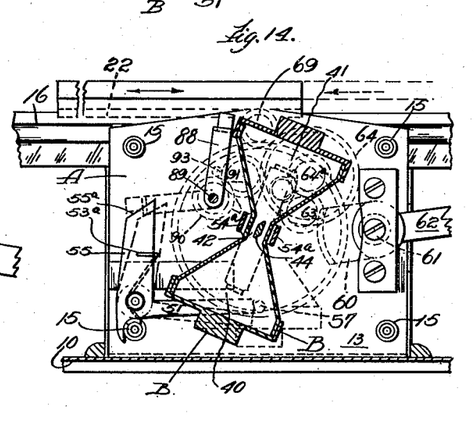
Figure 15:
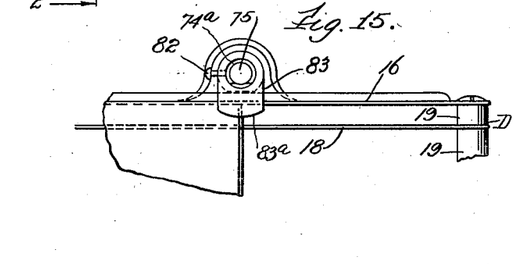
Figure 15 is a fragmentary view showing the means of engaging and supporting of heating coils with side bars section being taken at the line 15—15 on Figure 1.

The parts accordingly stand at rest in the positions indicated, respectively as seen in Figure 14, while the ponderable content of the timer falls from its upper chamber into the lower chamber; and having in mind that the gear train including the gear pinion, 90, will have been reversed by the reaction of the spring, 62ᵇ, upon the operator releasing the operating handle, it will be understood that the tripper will yield readily to the tendency of the timer to continue its swinging movement to its directly vertical position, which movement will be caused by the accumulation of the ponderable material in the lower end of the lower chamber of the timer; and thereupon the tripper being tilted back past the vertical plane of its pivot falls to its normal position lodged upon the upper beveled end of the bell crank latch, and by its weight and momentum wedges the said beveled end inwardly toward the timer causing the latched arm of said bell crank lever to be depressed releasing the stud, 57, of the gear, 48, so that that gear is rotated by the reaction of the spring, 50, and by the pinion, 69, engaging the rack, 22, retracts the heating unit to its idle position.

To ensure that the timer shall not by momentum swing past vertical position when released by the tripper, or if it should swing slightly past that position shall be immediately returned to vertical position, the above mentioned cross head, 40ª, on the hub, 40ᵇ, is provided having its upper and lower faces horizontal at the vertical position of the timer; and on the front plate, 14, there is pivoted at 56ª, a lever, 56, formed and dimensioned for lodging by gravity on the cross head, 40ª, said lever having its under edge positioned with respect to its fulcrum so that its horizontal position coincides with the horizontal position of the upper face of the cross head, the weight of the lever being sufficient to force the movement of the timer in either direction to its vertical position. And to prevent the timer being under any circumstance, whether by the gravity action of the lever, 56, or otherwise, rocked in reverse direction past vertical position, there is provided a ratchet disk, 66, fast on the timer rock shaft, 45, having ratchet notches, 66ª, at diametrically opposite positions for engagement of a dog, 77, pivoted on the front plate, 14, and checked against becoming accidentally rocked on its pivot in the reverse of ratchet-engaging position by a pin, 77ª, positioned for encounter by a tail, 77ᵇ, of the dog.

The heating unit comprising as mentioned above, an upper heater arranged to be moved into heat-treating position above the fixed carrier for the substance to be heat-treated and a lower heater adapted in the same movement to enter below said carrier, is constructed, for so positioning and entering the heaters, with mounting plates, 70 and 71, respectively above and below said fixed carrier and connected by telescoping supports, one at each side of the heating unit, comprising each an inner telescoping tubular stem, 73, projecting downwardly from the upper plate, 70, and an outer telescoping tubular stem, 74, projecting upwardly from the lower plate, 71, said lower plate having an interiorly threaded tubular stem continuation, 74ª, projecting downwardly below the plate, and a threaded tie and adjusting bolt, 75, whose head, 76, is a gear pinion, inserted through the top plate and through the telescoped stems and screwed into the extension stem, 74ª. A cover plate, 79, is applied over the upper heater and secured to the plate, 70, by screws, 70ª, and carries a centrally positioned gear, 80, which is secured rotatably to said cover plate by an operating knob handle, 81, applied to the stem and journal, 80ª, of said gear and secured thereto, for rotation thereof as well as for upholding the gear to the cover plate, by a flat diametrically extending tongue, 80ᵇ, engaging a corresponding slot in the lower end of the cover and by a headed retaining screw, 80ᶜ, screwed into the end of the stem. An idler gear, 82, at each side of the gear, 80, journaled on the screw, 70ª, at that side, connects the gear, 80, with the pinion bolt head, 76, so that the rotation of the knob handle serves to screw the bolt, 75, into the stem extension, 74ª, for adjusting the upper heater carried by the plate, 70, up or down to suitably space the upper heater from the upper surface of the heat-treated substance carried on the carrier, to accommodate material so carried of varying thickness.

The two plate members thus secured together and supporting the heating coils, as hereinafter more particularly described, are supported slidingly upon and engaged with the longitudinal side bars, 16, 16, by means of tubular retaining clips, 83, which are telescopically engaged outside the interiorly threaded stem extensions, 74ª, and secured by set-screws, 74ᶜ, said clips having each a lug, 83ª, at the lower end which protrudes under the side bar, 16, holding the plate structure engaged with said side bars, and thereby with the entire supporting frame structure, against vertical displacement, but with freedom for longitudinal sliding movement of said plate structure on the side bars over the casing, A.

Heating coils, 90 and 91, electrically energized are insulatedly mounted in familiar manner on the under side of the upper plate and on the upper side of the lower plate for heat radiation onto the upper and lower sides of the fixed carrier, D, for the substance treated, and upon the upper and lower sides of said substance itself, when, as in the construction illustrated, the said carrier is a grid consisting of the slender rods, 18, and the substance to be treated is bread to be toasted lodged on said slender rods, and thereby exposed in the intervals between the rods to the lower heater substantially as fully as it is exposed to the upper heater.

Both upper and lower heating coils are energized in one circuit, the two coils being connected by circuit wires, 85, coiled around the bolts, 75, the coils entering the telescoped stems for thus coiling around the bolt through a longitudinal slot, 73ᵇ, in the inner side of inner telescoped stem member, registered with notches, 74ᵇ, in the inner side of the outer telescoped stem. For the circuit connections from inleading and outleading wires indicated at 95 and 96, there are provided,—mounted upon an insulating block, 97, which is secured at any convenient point in the lower part of the frame structure, and as illustrated directly upon the base, 10, of the gearing frame, A,—conductors, 98 and 99, to which the inleading and outleading wires respectively are connected by binding screws seen at 98ª and 99ª, said conductors having pivoted to them respectively conducting rods, 100, 100, which are telescoped with tubular conductors, 101, 101, with coil springs, 102, coiled about them reacting between the two telescoped members for thrusting the outer telescoped members upwardly to hold their upper ends in contact with runways, 103, 103, formed of conducting material and mounted insulatedly upon the under side of the lower plate, 74, said outer telescoped members, 101, carrying at their upper ends rollers, 104, 104, for traveling in said runways with whose flanges in slots, 105, therein, the roller pintles are engaged for retaining the upper ends of the telescoped members in said runways.

I claim:—

1. In a construction for the purpose indicated, a gravity operated timing device consisting of a member pivotally mounted for gravity movement upon being over balanced toward either side of its pivotal support; means operated by the setting movement of the mechanism whose stay at said position is timed, for rocking said gravity device over its pivot to carry the loaded end to position above the pivot; means actuated by the same movement for arresting the first mentioned movement at a position at which the device is slightly over balanced toward the side from which it is moved, said arresting means being adapted to be easily forced back to permit the gravity device to arrive at a position with its center of gravity vertically aligned with the pivot when the gravitation of the contents to the lower end tends to so move it, said gravity device having a bar carried rigidly with it in its rocking movement having a face which is exposed upwardly at the said erect position of the device, and a pivoted bar arranged to swing downwardly into position for lodging upon said face of the bar at the erect position of the device at two points at opposite sides of the vertical plane of the pivot of the device, for stressing the latter toward said erect position from either side thereof.

2. In a construction for the purpose indicated in combination with a mechanism adapted to be set at predetermined position of its moving parts, and having means detaining the same at set position, a gravity operated timing device having means for releasing said detaining means, said timing device consisting of a member pivotally mounted for gravity movement upon being overbalanced toward either side of its pivotal support; means operated by the setting movement of the mechanism whose stay at set position is timed, for rocking said gravity device over its pivot to carry the loaded end to position above the pivot, and automatic one-way operating means operating on the timer independently of the timed mechanism for preventing the timer rocking in the reverse direction past vertical position.

3. In an apparatus for the purpose indicated, having a frame structure, a timing device and an element whose movement is to be timed thereby, the timed element being arranged to be moved otherwise than by the timer to a position at which its stay is to be determined by the timer; operating connections by which the movement of the timed element sets the timer for the commencement of its timing period; a spring connected for being wound by said movement of the timed element from an initial position, and arranged to react for returning the timed element to initial position, a catch for latching the winding connections at said position of the timed element against the reaction of said spring; the timer being arranged to release said latching means by its movement at the limit of its timing period; a member carried by the timer, means carried by the frame arranged to be released for gravitating into co-operation with said member by the movement of the timer due to the completion of its period, adapted by said co-operation to apply limited gravity check to the timer at vertical position of the latter tending to position and hold it yieldingly at said vertical position.

4. A timing device for the purpose indicated comprising a gravity operated element pivotally mounted having opposite end chambers with restricted communication and supplied with ponderable material adapted to gravitate gradually through the restricted communication from the upper chamber to the lower chamber for weighting the lower chamber to hold the device substantially erect with its chambers in vertical alignment, means for rocking the device about its pivot to carry the lower chamber upwardly toward erect position, means for opposing yielding resistance to said movement for arresting it before erect position is reached and pressure-exerting means arranged to act on the device to check it at erect position when the gravitation of the ponderable material from the lifted chamber to the lower chamber tends to carry the device to said erect position against the resistance of the first mentioned resisting element.

In testimony whereof, I have hereunto set my hand at Chicago, Illinois, this 20th day of September, 1928.

GEORGE BROWNING.